Patented Apr. 7, 1953

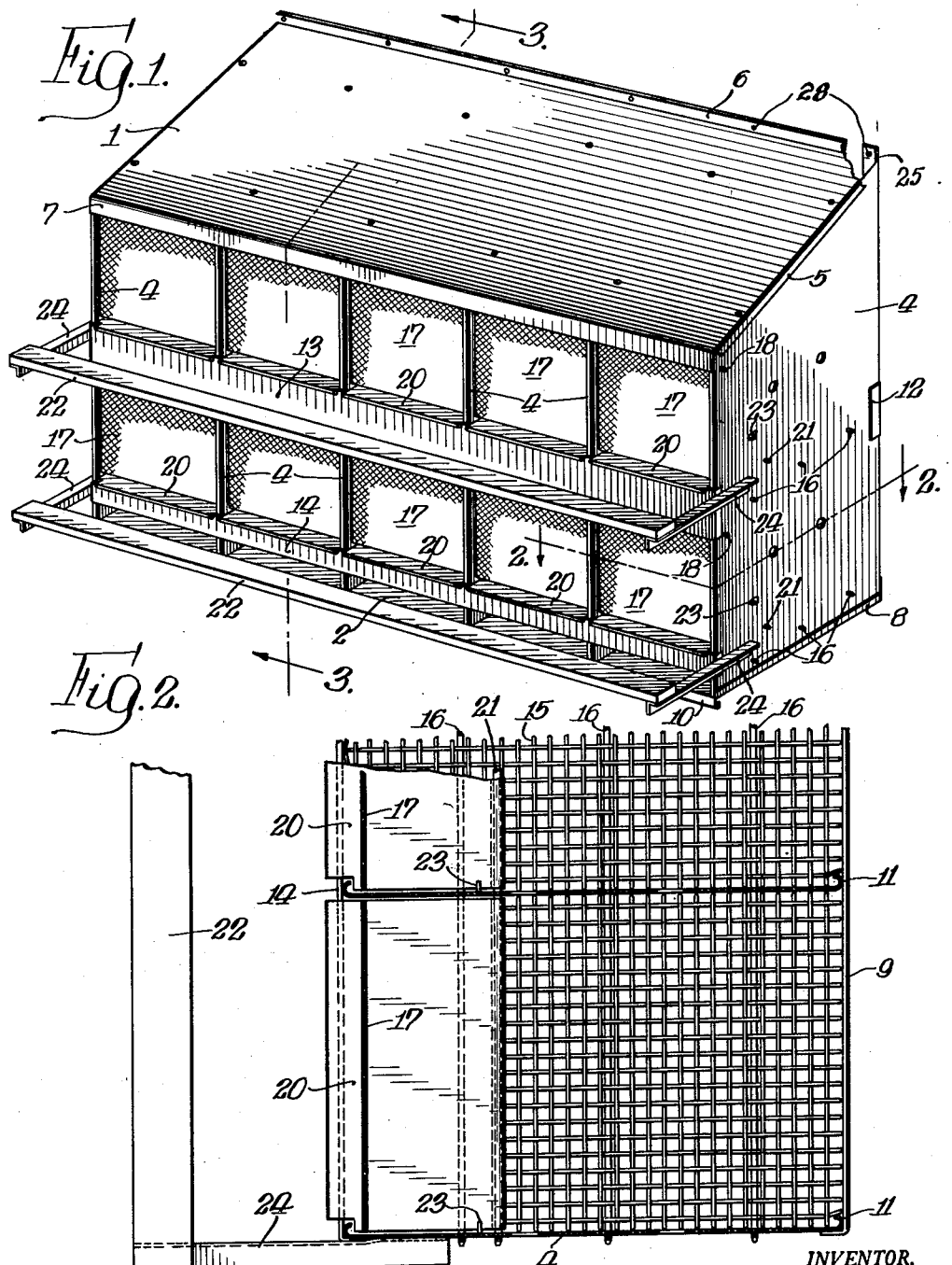

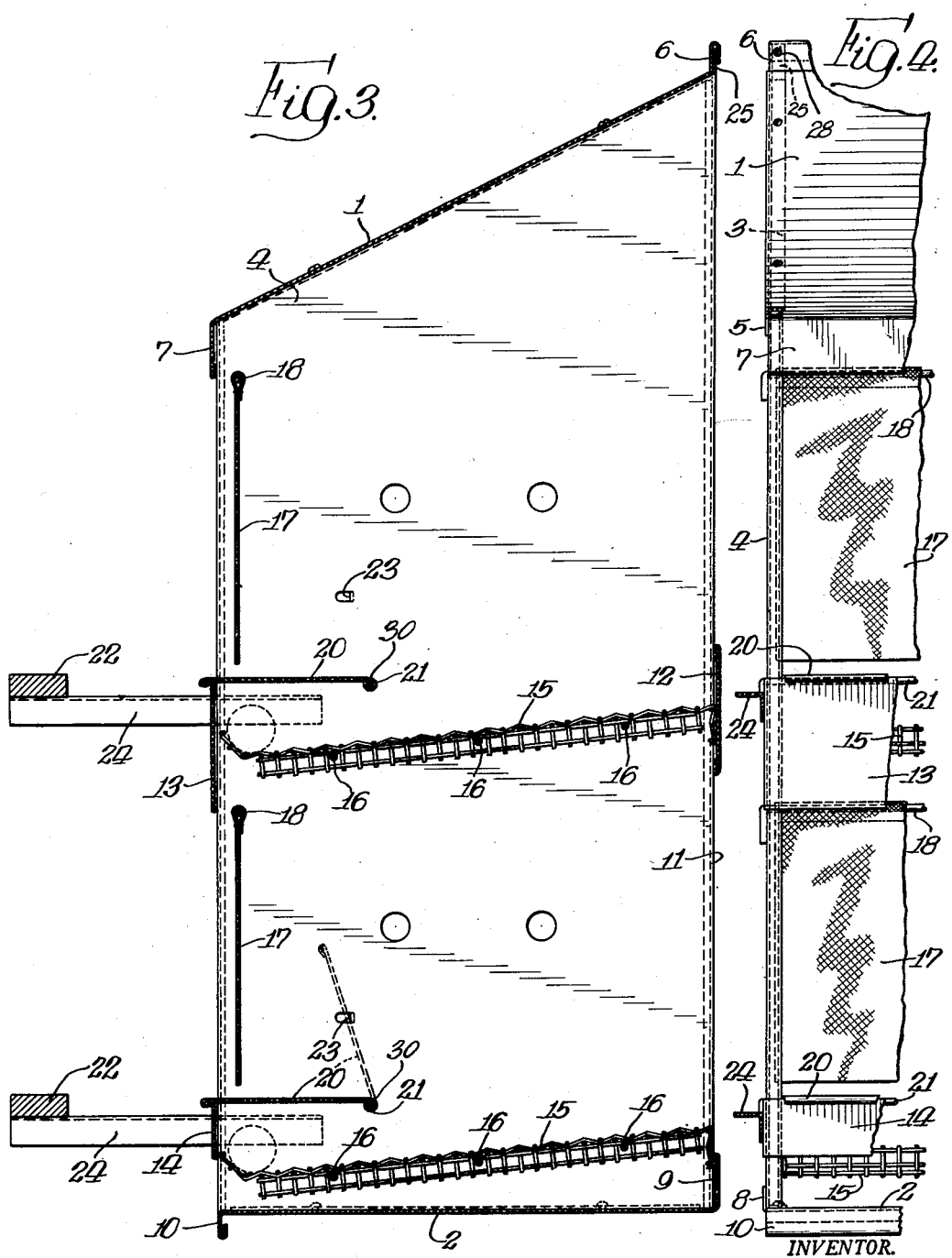

2,633,826

UNITED STATES PATENT OFFICE 2,633,826

POULTRY NEST

James Milton Hansen, Park Ridge, Ill.

Application June 3, 1950, Serial No. 166,003

5 Claims. (Cl. 119—48)

This invention relates to improvements in poultry nests. It has to do more particularly with poultry nests of the kind having egg collecting compartments to facilitate gathering of eggs and provided with hinged covers in which to protect the eggs against breakage and soiling by the fowl.

An object of the present invention is to arrange the egg compartment and its cover so as to discourage roosting of the fowl over them and to keep the egg compartment, its cover and the eggs therein free from droppings.

A further object is to arrange the egg compartment and its hinged cover to reduce the possibilities of the latter from being left in an open position by persons gathering eggs so as to expose the compartment, its cover and the eggs therein to soiling by the fowl.

A further object is to provide a simple, durable and inexpensive construction of a poultry nest having the above-mentioned advantages.

Other objects and advantages of the invention will become apparent from the following description of a preferred embodiment of the invention with reference to the accompanying drawings in which:

Figure 1 is a perspective of a battery of nests constructed in accordance with the present invention;

Fig. 2 is an enlarged partial section in the horizontal plane 2—2 of Fig. 1, viewed downwardly;

Fig. 3 is an enlarged vertical section in the plane 3—3 of Fig. 1 viewed in the direction of the arrows; and Fig. 4 is an enlarged partial front elevation.

It will, of course, be understood that the invention is applicable to single nests as well as to nest batteries such as illustrated in the drawings.

The nest battery of Fig. 1 is constructed of suitable sheet material such as galvanized sheet iron, except as hereinafter specifically noted. The top and bottom members 1 and 2 are secured in a suitable manner, such as by screws, to laterally turned flanges 3 on the upper and lower ends of the vertical partitions and end walls 4. The top member 1 has end flanges 5 turned downwardly outside of the respective end walls 4, an upwardly turned flange 6 along its rear edge and a downwardly turned front flange 7 along its front edge. The bottom member 2, likewise, has end flanges 8 turned upwardly outside of the respective end walls 4, an upwardly turned flange 9 along its rear edge, and a downwardly turned front flange 10 along its front edge. The structure is further strengthened by a rear cross-strip 12 and two front crosspieces 13 and 14. Each of the crosspieces 12, 13 and 14 has its ends bent flat against the outer sides of the end walls 4 and secured thereto by suitable means, such as screws.

The floor of each nest is formed of a piece of hardware cloth 15 supported on rods 16 such as galvanized iron wire rods which pass through openings in the partitions and end walls 4 and are suitably held in place as, for example, by means of cotter pins, split washers or spring clips (not shown) placed on the rods 16 adjacent the end walls 4. The hardware cloth floors 15 are strengthened by downwardly turned side and rear edges, as shown most clearly in Fig. 3. The downwardly turned side edges further serve to secure the floors against unintentional displacement on the rods 16 which pass through openings in the mesh of such turned-down side edges. However, the floor members 15 are easily removable and replaceable upon merely withdrawing the rods 16. The rods 16 are positioned to give a sufficient downward and forward inclination to the floors so that eggs deposited on them roll toward the front. The front edge portion of the floor 15 is curved upwardly on a radius of the order of the radius of an egg and meets the respective one of the cross members 13 and 14 substantially tangentially so that as a rolling egg reaches the forward end of the floor, its motion is stopped gently without breaking or cracking the shell of the egg.

For each nest there is a door curtain 17 which is formed at its upper edge with a conventional hem through which a cross rod 18 to support the curtain extends. The rods 18 also pass through the partitions and end walls 4 and are held against displacement by suitable means, such as conventional clips. The curtains may be made of any suitable fabric, but a synthetic plastic fabric is preferred.

An egg compartment cover member 20 is located above the forward portion of the nest floor. The cover 20 is pivotally supported at its rear edge 30 (Fig. 3) which is loosely rolled about a rod 21 passing through the partitions and end walls. The rods 21 are located sufficiently above the floors 15 to permit eggs rolling down the inclined floors to pass under the rods 21 and covers 20. The forward edge of each cover 20 extends forwardly under and past the lower edge of the curtain 17 and further forwardly over the upper edge of the respective one of the front crosspieces 13 or 14 upon which it normally rests. A rounded lug 23 is stamped from each of the side wall members 4 above and somewhat forwardly of each of the rods 21 and bent inwardly into the path of the cover member 20 to limit the opening movement of the latter so that it will always return to closed position by gravity after being lifted by an attendant gathering eggs.

Wood or other perches 22 are suitably spaced from the entrances of the nests to facilitate entry and exit of fowl from the nests and are suitably secured to forward ends of pieces 24 of angle iron, the rearward end portions of which are, likewise, suitably secured to the end walls 4.

Edges of sheet metal parts such as 1, 2, 12, 13, 14 and 20 which are exposed to contact by the fowl or the attendants are rounded, rolled or reversely folded as shown in the drawings to eliminate sharp edges capable of inflicting injuries. The front and rear edges of the side wall and partition members 4 are also rolled and a lug 25 extending from the upper end of the rearward part of the rolled rear edge of each member 4 extends upwardly between the flange 6 at the upper rear edge of the top member 1 and the folded over edge of said flange so that when the nest battery is hung by nails through registering apertures 28 in the lug 25, the flange 6 and the folded over edge portion of said flange, the weight of the nests is borne in large measure by the side wall members 4 through the lugs 25.

It will be seen that the egg collecting compartment of each nest is contained almost wholly within the nest itself and only a very narrow portion of the front edge of the cover 20 extends forwardly of the lower edge of the curtain 17 so that the member 17 discourages fowl from roosting on the nest compartment cover 20 and the latter is thereby kept free from droppings. An attendant gathering eggs may lift the cover 20 with one hand and then insert the same hand into the egg compartment to remove the eggs therefrom. The cover 20 closes automatically as the attendant's hand is withdrawn. This eliminates the possibility of an attendant leaving an egg compartment cover 20 in open position and breakage and soiling of eggs in the improved nests is prevented. Eggs in the collecting compartment under the cover 20 are held sufficiently remote from fowl using the nest and are further exposed to air circulating through the hardware cloth floor 15 so that undesirable continued heating of the eggs after they are laid is prevented.

It will be apparent that various modifications may be made in the structural detail of nests embodying the invention.

I claim:

1. A poultry nest having spaced side walls with substantially straight and vertical front edges, a nest floor member sloping downwardly from rear to front, a cover member above the forward portion of said floor member forming an egg-collecting compartment and supported for pivotal movement about its rearward edge portion in the said side walls rearwardly of said front edges, and an entrance curtain hung between the forward edges of said side walls above said cover member, and wherein said curtain, the front edges of said side walls and of said floor and cover members and thus also the front of said egg-collecting compartment are all at least close to a single substantially vertical plane.

2. A poultry nest comprising laterally spaced upright side walls having substantially straight and vertical front and rear edges, a nest floor located substantially solely between said side walls and sloping gently downwardly toward the front, a cover member above a minor portion of said floor along the front thereof, said cover member being at least almost wholly rearward of the substantially straight front edges of said side walls and forming with said portion of said floor member an egg-collecting compartment at least almost wholly rearward of said front edges of said side walls and within the front portion of the nest, means pivotally supporting said cover member adjacent its rearward edge portion in the said side walls and rearwardly of said front edges, means to support the front edge of said cover member with said cover member in closed position, curtain-hanging means close to the substantially straight front edges of said side walls and a curtain hanging from said hanging means, with its lower edge near the front edge of said egg-collecting compartment cover member and permitting entrance and exit through but normally substantially closing the front of said nest, whereby the major portion of said nest floor is available to an egg-laying hen, eggs in said compartment are accessible for easy removal from in front of the nest and fowl are discouraged from roosting and loafing on said cover member.

3. A poultry nest according to claim 2, comprising a partial front wall member substantially co-planar with the straight front edges of said side walls and upon the upper edge of which the front edge portion of said egg compartment cover member normally rests.

4. A poultry nest according to claim 2, wherein the floor member consists of hardware cloth and has vertical side edge portions adjacent the side walls and is supported and readily releasably locked in position by a plurality of transverse removable rods passing through said floor member edge portions and openings in said side walls.

5. A poultry nest according to claim 2, having stop means on at least one of said side walls to limit opening movement of the cover member to a position from which it will fall to closed position by gravity.

J. MILTON HANSEN.

REFERENCES CITED

The following references are of record in the file of this patent:

UNITED STATES PATENTS

| Number | Name | Date |
|---|---|---|
| 1,811,338 | Trullinger | June 23, 1931 |
| 1,828,406 | Grill | Oct. 20, 1931 |
| 1,914,160 | Pine | June 13, 1933 |
| 2,176,814 | Hawkins | Oct. 17, 1939 |
| 2,501,475 | Muehlfeld | Mar. 21, 1950 |
| 2,584,909 | Ockenfels | Feb. 5, 1952 |

FOREIGN PATENTS

| Number | Country | Date |
|---|---|---|
| 395,769 | Great Britain | July 27, 1933 |